United States Patent [19]

Arcella et al.

[11] Patent Number: 5,329,465

[45] Date of Patent: Jul. 12, 1994

[54] ONLINE VALVE DIAGNOSTIC MONITORING SYSTEM

[75] Inventors: Frank G. Arcella, Bethel Park Borough; Fred H. Bednar, Shaler Township, Allegheny County; Jan J. Schreurs; James M. Forker, both of Murrysville, all of Pa.

[73] Assignee: Westinghouse Electric Corp., Pittsburgh, Pa.

[21] Appl. No.: 397,323

[22] Filed: Aug. 22, 1989

Related U.S. Application Data

[63] Continuation of Ser. No. 115,069, Oct. 30, 1987, abandoned.

[51] Int. Cl.⁵ ............................................. G06F 15/46
[52] U.S. Cl. ............................... 364/551.01; 364/138; 364/570; 137/554; 290/52; 395/915
[58] Field of Search .................. 364/551.01, 550, 138, 364/570; 137/554; 290/52; 395/914, 915

[56] References Cited

U.S. PATENT DOCUMENTS

| Re. 31,247 | 5/1983 | Johnstone | 364/138 |
|---|---|---|---|
| 4,059,960 | 11/1977 | Osborne | 137/554 |
| 4,184,205 | 1/1980 | Morrow | 364/508 |
| 4,258,421 | 3/1981 | Juhasz et al. | 364/424 |
| 4,274,438 | 6/1981 | Coste | 73/9 |
| 4,383,298 | 5/1983 | Huff et al. | 364/200 |
| 4,410,950 | 10/1983 | Toyoda et al. | 364/551 |
| 4,517,468 | 5/1985 | Kemper et al. | 290/52 |
| 4,523,286 | 6/1985 | Koga et al. | 137/554 |
| 4,542,649 | 9/1985 | Charbonneau et al. | 173/168 |
| 4,551,795 | 11/1985 | Fisher et al. | 364/571 |
| 4,570,903 | 2/1986 | Crass | 251/129.12 |
| 4,581,707 | 4/1986 | Millar | 364/509 |
| 4,590,963 | 5/1986 | Gardner et al. | 137/554 |
| 4,612,620 | 9/1986 | Davis et al. | 364/508 |
| 4,615,321 | 10/1986 | Haefner et al. | 364/571 |
| 4,628,434 | 12/1986 | Tashiro et al. | 395/54 |
| 4,642,782 | 2/1987 | Kemper et al. | 364/550 |
| 4,644,479 | 2/1987 | Kemper et al. | 364/550 |
| 4,694,390 | 9/1987 | Lee | 137/554 |
| 4,698,756 | 10/1987 | Gonzalez et al. | 364/557 |
| 4,719,587 | 1/1988 | Berte | 364/552 |
| 4,816,987 | 3/1989 | Brooks et al. | 364/165 |
| 4,881,230 | 11/1989 | Clark et al. | 371/20.1 |
| 4,931,951 | 6/1990 | Murai et al. | 395/51 |

FOREIGN PATENT DOCUMENTS

| 0002232 | 6/1979 | European Pat. Off. . |
|---|---|---|
| 0117365 | 10/1980 | European Pat. Off. . |
| 0205764 | 12/1986 | European Pat. Off. . |
| 0287299 | 4/1987 | European Pat. Off. . |

OTHER PUBLICATIONS

European Search Reoprt, The Hague, Mar. 9, 1989.
Haynes et al., Motor Current Signature Analysis Method for Diagnosing Motor-Operated Devices, U.S. patent Ser. No. 06/913,193, abandoned Jan. 17, 1989.
Charbonneau, Arthur, "Early Diagnosis of Motor Operated Valve Mechanical and Electrical Degradations", The American Society of Mechanical Engineers (84--NE-16), 1984.

(List continued on next page.)

*Primary Examiner*—Vincent N. Trans
*Attorney, Agent, or Firm*—M. G. Panian

[57] ABSTRACT

An online valve monitoring system senses operational characteristics of a valve and provides a diagnosis of aberrations in the characteristics. Sensors, coupled to a valve, supply sensor signals as output to a data acquisition system to be transmitted to a remote location. An I/O processor at the remote location receives the sensor signals and a diagnostic processor extracts characteristic features from the sensor signals as deviations from baseline data for the valve. An expert system applies a rule base to the characteristic features individually or in combination to diagnose the causes of the deviations. Use of multiple sensors increases the confidence of the diagnosis which can be immediately communicated to an operator and used for scheduling maintenance of the valve. Use of this diagnosis and the trend line of historical data permits scheduling of preventive maintenance.

19 Claims, 9 Drawing Sheets

OTHER PUBLICATIONS

Dimmick, Joseph et al., "Ultrasonic leak detection cuts valve maintenance costs", *Power Engineering*, Aug. 1986, pp. 35–38.

Goldberg, Eddy, "University develops campuswide network" (and sidebar Software Notes), Computerworld, vol. XX, No. 46, Nov. 17, 1986.

Zengerle, Patricia, "Distributed DBMS To Link 3M's Plants Throughout U.S.", MIS Week, Nov. 3, 1986, p. 49.

Fabian, Pascal, "Ingress for the PC", Data Based Advisor, Oct. 1987, pp. 30–36.

The Ingres Advantage, Fall 1986.

The Distributed SQL Relational Database Sysetm, Ingres, Fall 1986.

Carroll, Paul, "New Systems Tackle Problem of Tapping In to Data Bases", The Wall Street Journal, Oct. 31, 1986.

Electric Power Research Institute, "Improvements in Motor-operated Valves", EPRI NP-4254 Interim Report for Project 2233-2, Nov., 1985.

Electric Power Research Institute, "Key valves prioritization study", EPRI NP-3611 Final Report of Project 2233-1, Oct. 1984.

Texas Instruments Personal Consultant Series Brochure, 1987.

VALVE MONITOR MAIN MENU

| OPTION | FUNCTION | OPTION | FUNCTION |
|---|---|---|---|
| 1 | SUMMARY OF PERFORMANCE | 9 | DATABASE MANAGER |
| 2 | VALVE MAINTENANCE MENU | 10 | EXPERT SYSTEM |
| 3 | ANALYSIS | 11 | EXAMINE SYSTEM CONFIGURATION |
| 4 | | 12 | MODIFY SYSTEM CONFIGURATION |
| 5 | | 13 | |
| 6 | | 14 | |
| 7 | | 15 | EXECUTE |
| 8 | | 16 | EXIT |

ENTER OPTION: [STATUS]

FIG. 5

SUMMARY OF PERFORMANCE

| VALVE ID | TAG NO. | VALVE TYPE | STATUS | CONFIDENCE FACTOR | EVENTS |
|---|---|---|---|---|---|
| 1 | PV 8010 | GLOBE | NORMAL | 80 | 21 |
| 2 | PV 8011 | GLOBE | NORMAL | 80 | 40 |
| 3 | PV 8020 | GLOBE | NORMAL | 80 | 21 |
| 4 | PV 8021 | GLOBE | FAILURE TO CLOSE (LEAK) | 70 | 42 |
| 5 | PV 8030 | GLOBE | NORMAL | 85 | 43 |
| 6 | PV 8031 | GLOBE | NORMAL | 85 | 50 |
| 7 | PV 8040 | GLOBE | NORMAL | 85 | 51 |
| 8 | PV 8041 | GLOBE | NORMAL | 85 | 52 |
| 9 | PV 8050 | GLOBE | NORMAL | 85 | 100 |
| 10 | PV 8051 | GATE | BROKEN GEAR | 60 | 500 |

ENTER OPTION:

FIG. 7

ANALYSIS MENU

| OPTION | FUNCTION | OPTION | FUNCTION |
|--------|----------|--------|----------|
| 1 | TOTAL SUMMARY OF EVENTS | 9 | |
| 2 | LAST VALVE DATA | 10 | |
| 3 | MONTH TREND | 11 | |
| 4 | YEAR TREND | 12 | |
| 5 | BASELINE DATA | 13 | |
| 6 | TIME TO FAILURE | 14 | |
| 7 | | 15 | |
| 8 | | 16 | MAIN MENU |

ENTER OPTION:

FIG. 8

MAINTENANCE RECORD

COMPONENT INDEX: 11     LAST DATE SERVICED: 16-JUN-1944

COMPONENT TAG: GV001     NEXT SCHEDULED SERVICE: 04-APR-1987

COMPONENT TYPE: GLOBE     REQUIRED SERVICE

SAFETY CLASS (Y/N): Y     BASELINE AVERAGES TO BE COMPLETED: 21

COMPONENT DESCRIPTION:     MAIN COOLANT LOOP VALVE

FIG. 9

ONLINE VALVE DIAGNOSTIC MONITORING SYSTEM

This application is a continuation of application Ser. No. 07/115,069, filed Oct. 30, 1987, now abandoned.

BACKGROUND OF THE INVENTION

1. Field of the Invention

The present invention is related to an online diagnostic valve monitoring system and, more particularly, to a system for monitoring valves in a complex piping network such as that found in an electrical power generating station.

2. Description of the Related Art

Recent studies funded by the Electrical Power Research Institute (EPRI) and the Nuclear Regulatory Commission (NRC) have shown that both nuclear and fossil fuel electrical generating plants are subjected to a significant number of shutdowns or outages due to valve failures, despite the fact that 30% to 50% of annual plant maintenance is devoted to valves. Other facilities such as chemical processing plants, pulp and paper plants, off shore platforms, orbiting satellite power systems and almost any nuclear powered device, including nuclear submarines, have complex piping systems which can be disrupted by valve failures. The complexity of such systems make the likelihood of valve failure during a relatively short period of time virtually inevitable.

For example, a typical electrical power plant may have 5,000 to 10,000 valves. Of these, approximately 5% to 10% are critical to maintaining production of electricity at the plant. Despite maintenance efforts, it is common for forced outages to occur every 3 to 4 months due to valve malfunctions. Furthermore, when a large valve fails, the outage may last for over three weeks.

There have been numerous efforts to avoid this situation. In order to minimize the likelihood of causing an outage, valve manufacturers commonly give extremely conservative estimates of valve life and service intervals. Electrical power companies have responded by scheduling valve maintenance or replacement which is performed regardless of whether there is any problem with the valve. These two factors combine to result in excessively high maintenance costs. Typically, 30% of annual plant maintenance is devoted to valves and at some plants as much as 50% of all maintenance is valve-related.

Despite these efforts, outages caused by valves continue to occur. A major southeast utility is recognized as having one of the best maintained nuclear power plants in the country. Yet in the early 80's, this plant experienced two weeks of forced outages per year due to valve-related causes.

There have been attempts to reduce the high cost of unnecessary maintenance while reducing forced outages caused by valve malfunctions. One attempt has been to schedule maintenance based on the statistical history of valve failures for particular valves and particular locations in the piping system. Other efforts have been directed to testing valves to determine when maintenance is required. Several different systems which attempt to meet this need are described in the November 1985 Interim Report EPRI NP-4254 for Project 2233-2.

One technique summarized in this EPRI report is a system which measures motor current of a motor operated valve (MOV), the tripping of control switches and movement of the "spring pack" which indirectly measures valve stem thrust. The conventional equipment used to make these measurements is capable of measuring one valve at a time per measuring device and requires that the equipment be connected only temporarily. The signal traces which result from the sensors are recorded and analyzed by a human expert to determine whether the valve is adjusted and operating properly. As a result, when the valve is determined to be in need of maintenance, a decision must be made whether to extend the outage for the immediate repair of the valve or whether to wait until the next outage (planned or unplanned) occurs. This system is described in more detail in publication 84-NE-16 of the American Society of Mechanical Engineers (ASME) and in U.S. Pat. No. 4,542,649, issued Sept. 24, 1985 to Charbonneau et al. This system is claimed to be capable of detecting mechanical wear in the valve or motor operator, improperly adjusted control switches, degradation of the motor's electrical system and improper packing or lubrication of the valve.

While the diagnostics provided by this system are useful, there are significant drawbacks. The indirect sensing of stem strain using the spring pack of a motor operated valve provides less information than direct sensing and introduces the likelihood of error. With 250 to 1,000 critical valves in a typical power plant, the time required to set up and test each of the critical valves during an outage is prohibitive. Either a large number of test stations and manpower must be used or the outage must last for a long period of time; otherwise, only a portion of the critical valves are tested at each outage. In addition, the time required for analysis by a human expert inevitably results in further delays in ending the outage or in repairing a malfunctioning valve.

As a result of these drawbacks, EPRI Project 2233-2 involved the use of a testable microprocessor control system in motor operated valves. Such a system provides an increased amount of information about the operation of the motor, but little information is provided about the mechanical operation of the valve. Therefore, an ultrasonic sensor was used in the EPRI project to sense stem elongation. The use of such sensors, like the first system described above, is unable to provide all of the information which would be useful. In addition, the EPRI project did not address the problems of data collection and data analysis for a large number of valves.

The long-felt need for an improved method of valve diagnosis for complex piping systems has prompted the development of other techniques. For example, analysis of motor current signals has been undertaken by Haynes and Eissenberg at Oak Ridge National Laboratory (ORNL). According to the U.S. Department of Energy, this work has resulted in U.S. patent application Ser. No. 06/913,193, incorporated herein by reference. Copies of the '193 application are available from DOE and thus, these techniques are known as of the filing of the subject application. As a result, the contents of the '193 application can be considered as describing the knowledge of one of ordinary skill in the art of analyzing motor current traces.

The large number of valves which are critical to a power plant's operation and the large number of valves which require maintenance make the prior art "one at a time" systems extremely inefficient. Substantial amounts of time and money are required to perform the tests on each valve and then the data must be analyzed by a human expert one valve at a time. These problems are not unique to power plants, but can be found in almost any complex piping system having large number of valves including petrochemical plants, pulp and paper plants and virtually all applications of nuclear power. When techniques are used that require test equipment to be brought to the site of the valve near a nuclear reactor, the maintenance personnel may also be exposed to unnecessary radiation.

SUMMARY OF THE INVENTION

An object of the present invention is to provide increased availability of a piping system by diagnosing malfunctioning valves before they fail, i.e., incipient failure detection.

Another object of the present invention is to provide reduced maintenance requirements by performing maintenance on operational units in a plant only when required.

Yet another object of the present invention is to provide a plant monitoring system capable of continuous monitoring at full plant operating conditions.

A further object of the present invention is to provide a valve diagnostic system capable of evaluating the maintenance performed on a valve without increasing the time required to perform the maintenance.

Another object of the present invention is to provide a valve maintenance diagnostic system that can identify valves needing maintenance well before the beginning of an outage, whether planned or unplanned.

Yet another object of the present invention is to provide a plant operation monitoring system that identifies the cause of a malfunction and thereby the parts required for repair of operational units being monitored, prior to disassembly of the units.

A further object of the present invention is to provide a valve monitoring system capable of remote monitoring of valves where access to the valves is difficult or dangerous.

Another object of the present invention is to provide a monitoring system requiring a minimum number of personnel to oversee the monitoring while providing information in a form usable by inexpert individuals.

Yet another object of the present invention is to provide a valve diagnostic system capable of verifying a diagnosis based on a signal from one sensor by using a signal provided by a different sensor on the same valve.

A further object of the present invention is to provide a valve diagnostic system capable of predicting the useful life of a valve that shows signs of wear or misadjustment.

Another object of the present invention is to provide a plant operation monitoring system capable of comparing similar operational units in the same plant or in different plants, and identifying generic problems with units in particular applications or from a particular manufacturer.

The above objects are attained by providing an online valve diagnostic system for diagnosing improper operation of a valve. The system comprises sensors, each simultaneously sensing a different operational characteristic of the valve, to produce corresponding sensor signals; data acquisition means for transmitting the sensor signals; processing means for processing the sensor signals to produce processed signals and for comparing the processed signals to produce a diagnosis of the valve; and output means for outputting the diagnosis of the valve.

Preferably, there are at least three sensors per valve including a motor current sensor for detecting current drawn by a motor operating the valve and strain and position sensors, coupled to a valve stem in the valve, for sensing tension, compression and position of the valve stem. The system preferably includes data storage means for storing base line data and historical data. The processing means preferably includes signal processing means for extracting characteristic features of the sensor signals from each of the valves by comparing the sensor signals with the base line data to determine deviations therefrom in proportion to the base line data, whereby the characteristic features are dimensionless. The signal processing means preferably also provides a significance indication for each of the characteristic features in dependence upon the magnitude of the deviations between the sensor signals and the base line data corresponding thereto. The processing means also preferably includes diagnosis means for evaluating the characteristic features by application of an expert system rule base to provide a diagnosis of a malfunction causing the deviations in the sensor signals and for comparing the deviations to determine a confidence factor for the diagnosis of the valve. Analysis means is preferably provided for analyzing the historical data to detect a trend in changes in the sensor signals and for providing maintenance scheduling recommendations.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 5 is an example of a computer screen display used by a human operator to access a valve diagnostic system according to the present invention;

FIG. 7 is an example of a computer screen illustrating summary information provided by a valve diagnostic system according to the present invention;

FIGS. 8 and 9 are examples of other displays that may be provided by a valve diagnostic system according to the present invention.

DESCRIPTION OF THE PREFERRED EMBODIMENTS

Figure 1:
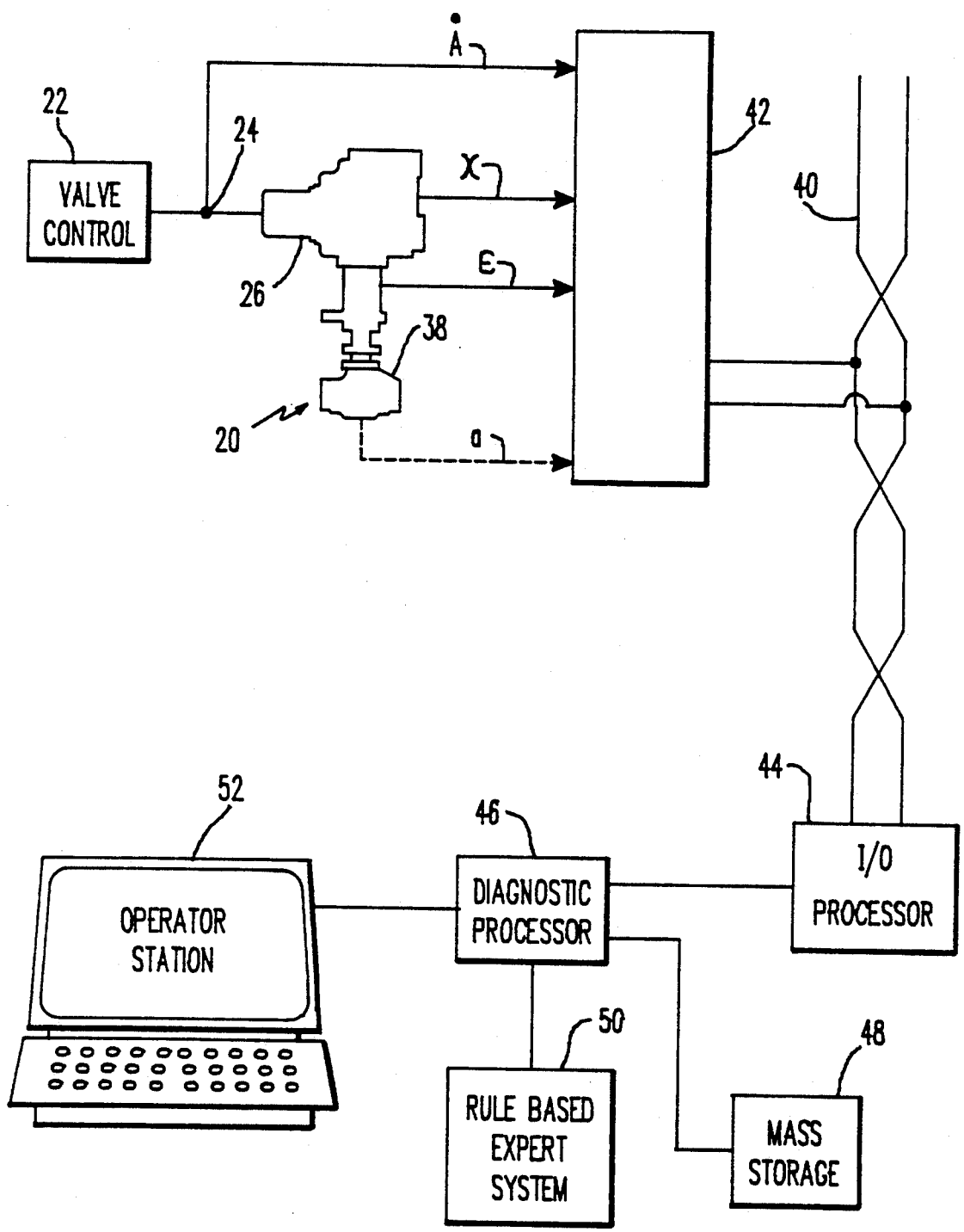
FIG. 1 is a block diagram of a valve diagnostic system according to the present invention.

The drawbacks of the prior art are overcome by providing an online valve diagnostic system which continuously monitors valves and records aberrations in their operation. Although only one valve 20 is illustrated in FIG. 1, the number of valves which may be monitored by a system according to the present invention is limited only by the capacity of the equipment used. Thus, while a preferred embodiment will be described below, the invention is not limited to use on such equipment.

The valves which are monitored in a system according to the present invention are controlled by some remote means, indicated in FIG. 1 as valve control 22. In an electrical power generating station, typically motor operated valves (MOVs) are used and valve 20 in FIG. 1 is illustrated as an MOV. However other types of remotely controlled valves are used in other environments to which the present invention could be applied. Some of the modifications to the preferred embodiment which would be necessitated in such environments will be noted below.

Figure 2:
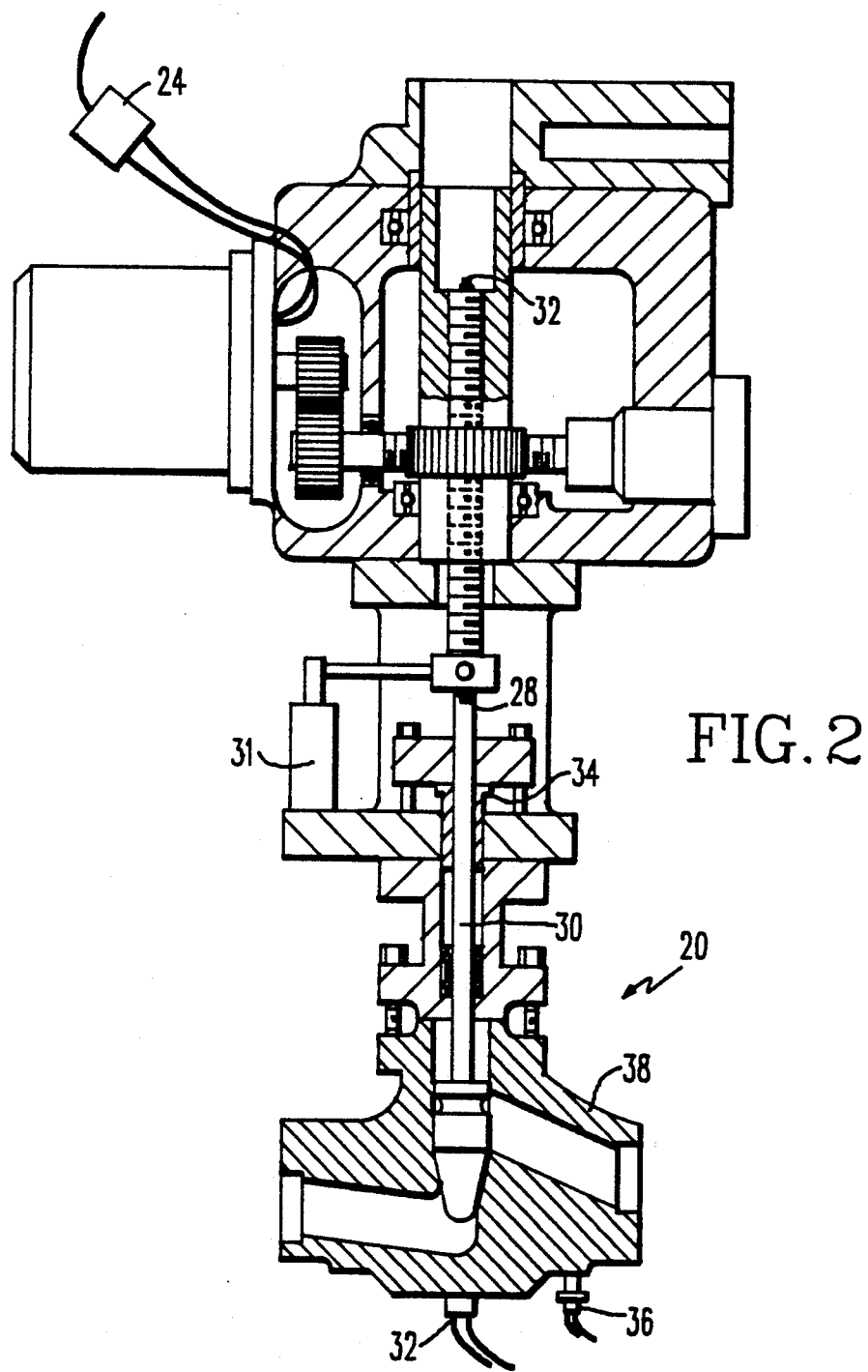
FIG. 2 is a cross-sectional diagram of a globe valve showing the location of sensors that may be used to monitor the operation of the valve.

FIG. 2 is a partial cross-sectional view of a motor operated valve. Each valve monitored by a valve diagnostic system according to the present invention has sensors coupled thereto for simultaneously sensing different operational characteristics of the valve. These sensors preferably include power sensing means for providing an indication of power used by the valve. The power sensing means for an MOV may be a motor current sensor 24 for detecting current drawn by the motor 26 which actuates the valve 20. In some applications, such as variable speed valves used in petrochemical plants, a voltage or wattage sensor (not shown) is also desirable. Such a sensor would also be useful for detecting fluctuations in voltage supplied to the motor which might affect other readings. In a pneumatically controlled valve, a pressure sensor or flow meter may be used to detect the air pressure required to actuate the valve. In addition to the power sensing means 24, the valve 20 is preferably monitored by stem strain sensing means 28 for directly sensing tension and compression of the valve stem 30. In a butterfly valve, stem torque would be measured. In addition, the sensors preferably include position sensing means 31 for sensing a position of the valve stem 30 and, indirectly, travel speed.

For a small, e.g., 1.5 inch, globe valve such as that illustrated in FIG. 2, in a clean and safe environment, the current sensing means may be provided by a SIMPSON Clamp Model 150 ammeter or by a current transformer, the strain sensing means by a MICROMEASUREMENTS dual bridge strain gauge attached just above the seal of the valve and the position sensing means may be a SCHAEVITZ LVDT position sensor with a travel of 2 inches. In a larger valve, a resistance slide wire or lanyard-type position sensor would be preferable to reduce cost. These sensors may be replaced with other sensors, capable of making the same types of measurements, that are appropriate to the size and location of the valve being monitored.

While these three sensors in combination are capable of providing a large amount of information about a valve, additional sensors may be used to detect specific problems which occur in specific valves. For example, FIG. 2 illustrates accelerometers 32 positioned along the valve stem axis, a moisture/humidity sensor 34 at the seal surrounding the valve stem 30 and an acoustic emission transducer 36 mounted on the valve body 38. The signals produced by these additional sensors are indicated in FIG. 1 by the dashed line labeled "a", while the current, position and strain sensors are indicated in FIG. 1 by $\overset{\circ}{A}$, $\chi$, $\epsilon$, respectively.

The sensor signals are received by data acquisition means for transmitting the sensor signals to a remote location. There are many types of data acquisition systems which may be used for this purpose; however, when the valves are in a nuclear installation, it is desirable to use a data acquisition system which has a minimum number of wires. An example of such a data acquisition system is manufactured by Westinghouse. In this system, described in U.S. patent application Ser. No. 934,238 filed Nov. 20, 1986 (issued as U.S. Pat. No. 4,770,842 on Sept. 13, 1988) and incorporated herein by reference, the main wiring path 40 consists of a coaxial cable and each of the drops 42 can handle four sensor signals which are frequency multiplexed and transmitted over the coaxial cable 40 together with the sensor signals from other valves to the I/O processor 44. Another alternative is to use a conventional intelligent data acquisition system. In other words, a data acquisition system capable of receiving commands from a diagnostic processor 46 can be used to control acquisition of data via a number of channels. The first system is preferred due to both lower cabling cost and improved isolation from noise.

Using either of these data acquisition systems, the sensor signals from 100 to 200 critical or "key" valves can be transmitted using a single system. If the number of valves to be monitored by the valve diagnostic system exceeds the capacity of a single data acquisition system or I/O processor 44, additional signal paths 40 or I/O processors 44 can be added.

The drop or sensor processing module (SPM) 42 in the second system samples and multiplexes the sensors at a rate of 223 samples/second. The resulting signal is converted to frequency modulation on one of 128 carrier frequencies or channels. The carrier frequency is jump selectable in the SPM. In addition, power is supplied via the coaxial cable so that separate power feeds to the sensors are unnecessary. The I/O processor 44 includes a receiver that is capable of receiving any of the 128 frequencies.

As illustrated in FIG. 1, in addition to the I/O processor 44, the remaining units of the online valve diagnostic system are located at the remote location. These units include a diagnostic processor 46, mass storage unit 48, rule based expert system 50 and operator station 52. In a system monitoring a small number of valves, all five of these units may be controlled by a single processor such as the processor in a personal computer, e.g., an IBM PS2 Model 70. In the flow chart and block diagram illustrated in FIGS. 3 and 4, the physical separation of these five units is not delineated, since the physical distribution of the processing is determined by the number of valves to be monitored and the power of the processor. Therefore, the following description will refer to the functional differences that are illustrated as separate blocks in FIG. 1, but may be performed on a single physical processor. Also, as noted above with respect to I/O processor 44 in a large system, a single function may be distributed over more than one physical processor.

Figure 3:
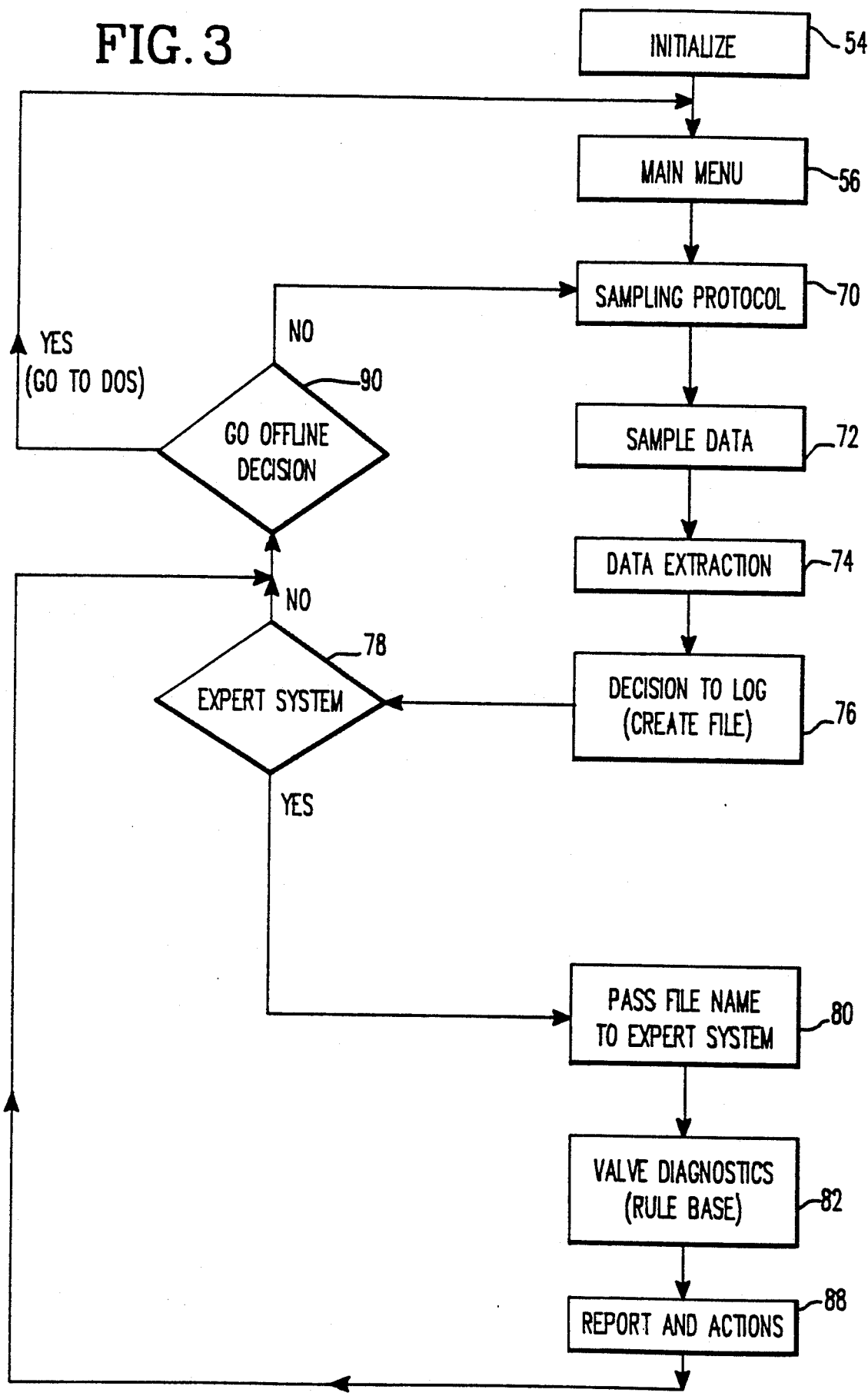
FIG. 3 is a flow chart of overall program flow in a valve diagnostic system according to the present invention.
Figure 4:
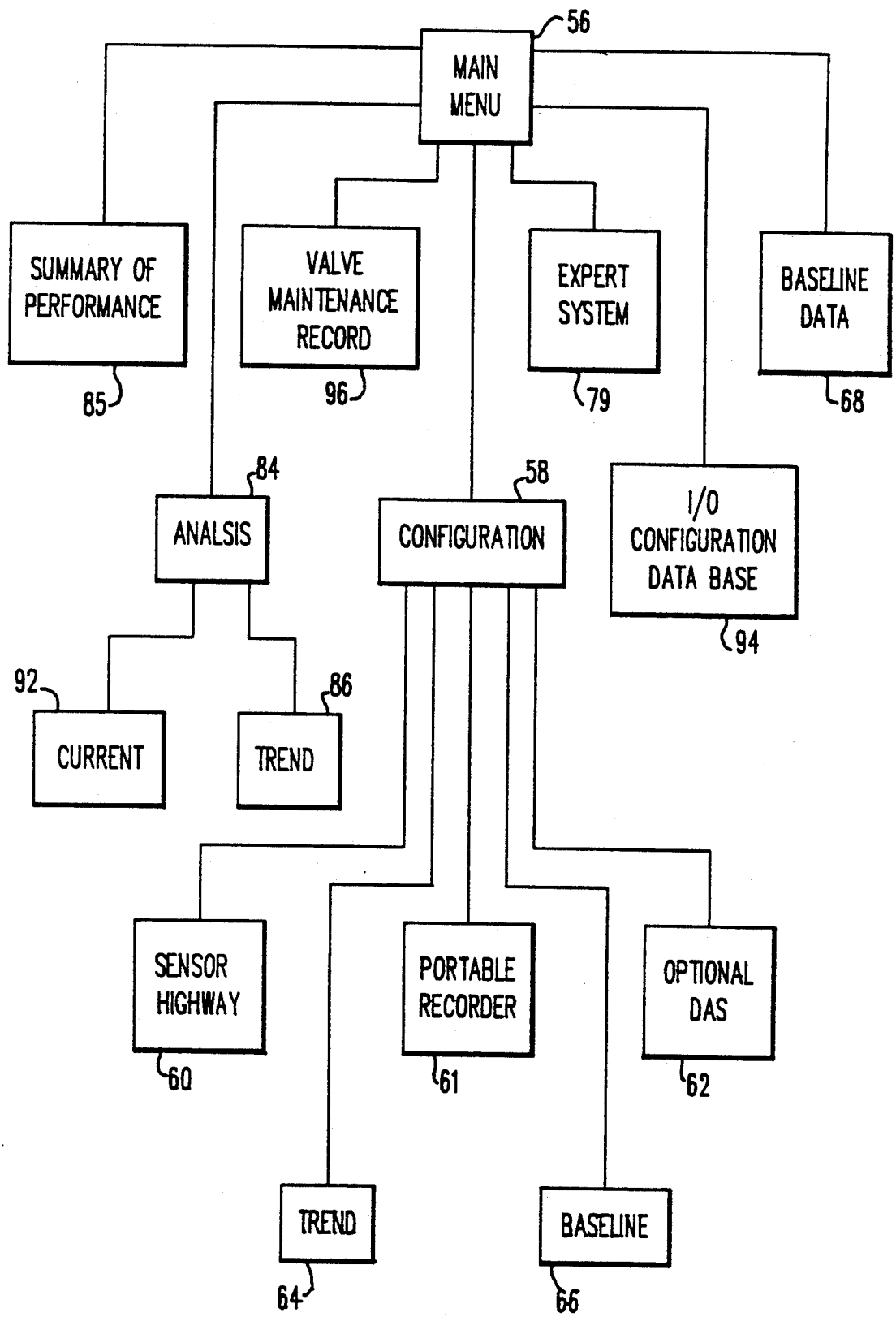
FIG. 4 is a block diagram of software modules in a valve diagnostic system according to the present invention.

As indicated in FIG. 3, the first step 54 is to initialize the system. This step varies depending upon whether the database has been fully established, e.g., when the online valve diagnostic system is turned on after maintenance has been performed during an outage, or the system is being used for the first time at the plant. If the database has not been established, it is first necessary to configure the system. As indicated in FIG. 4, the main menu 56 is used to select the configuration routine 58 to indicate the type of input. The options illustrated in FIG. 4 include a sensor highway 60 such as that described above, a portable recorder 61 or some other data acquisition system (DAS) 62.

In addition, it is necessary to configure the databases. The frequency with which data from each of the valves is to be recorded for trend analysis is defined in a configuration database 94. Some valves are actuated (opened or closed) with a frequency measured in months, while others are actuated several times per day. It is desirable to store the data from the less frequently actuated valves every time the valve is actuated, while the data from the more frequently actuated valves is only recorded periodically or when aberrations occur. This frequency of recording data is designated during configuration of the system. In addition, it may be desirable to segment the historical data by short, medium and long term data with different retention criteria for each file, e.g., the last twenty actuations in the short term file, in the medium term file, perhaps ten averages of the short term file taken for every twenty entries therein and in the long term file, averages of the medium term file taken for every ten entries.

The valves which will be monitored must of course be identified. While the rules of valve performance are generic, the sensor signals from each valve must be interpreted uniquely. First, it is necessary to perform a baseline configuration 66 to determine how the baseline data is to be created and stored. The baseline data is created or maintained in block 68 by, e.g., recording the first ten actuations of a valve to determine average and standard deviations for the signals from each of the sensors of each of the valves. This data is then stored in the mass storage unit 48.

FIG. 5 is an example of the display at operator station 52 when the diagnostic processor 46 is executing the main menu block 56. As indicated in FIG. 5, the system configuration may be modified at any time using option 12. This provides great flexibility by permitting additional valves to be added and different data acquisition systems to be used. Also included in the system configuration is the sampling protocol 70 (FIG. 3). This protocol ensures that the less frequently actuated valves are sampled every time even if a more frequently actuated valve is being actuated at the same time. Similarly, more critical valves may have a higher sampling priority than less critical valves. Option 12 on the main menu permits this sampling protocol to be changed when, for example, a valve which is actuated relatively often is found to deteriorate rapidly so that it is desired to capture all actuations of the valve.

Second, the expert system rule base must be initialized. This process is described in detail below together with the description of the operation of the expert system.

Once the system has been configured, the flow illustrated in FIG. 3 may be followed. The main menu illustrated in FIG. 5 is displayed in step 56. Then, while waiting for one of the options to be selected, the I/O processor 44 enters the loop which begins with the sampling protocol step 70. The highest priority valve being actuated at a given time is selected by the sampling protocol 70 and control passes to sample data step 72. As described above, the I/O processor 44 instructs the receiver to receive the sensor signals for the valve being sampled and this data is stored temporarily for data extraction in step 74.

The data extraction process used in the valve monitoring system is defined by the configuration database and is tailored to each valve. The first decision is to determine the type of valve that is being monitored. Basic valve types include globe valves, like that illustrated in FIG. 2, gate valves, butterfly valves, diaphragm valves, etc. Each type of valve has a generic signal "signature" which is similar for different valves and different sizes of the same type.

Figure 6:
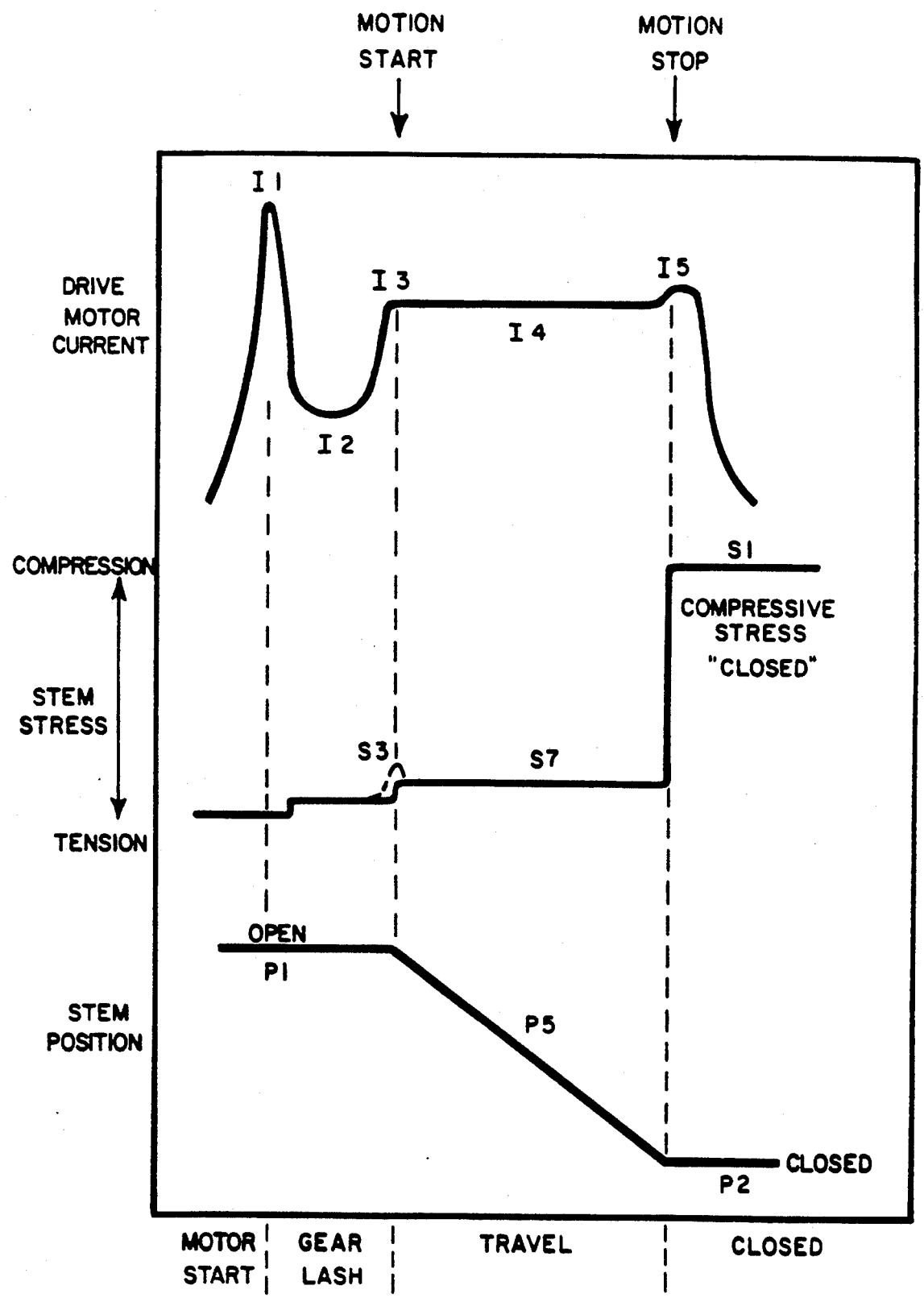
FIG. 6 is an example of signal traces that may be obtained for a motor operated globe valve in a closing cycle from sensors used in a valve diagnostic system according to the present invention.

An example of a signal signature for the globe valve illustrated in FIG. 2 is illustrated in FIG. 6. The baseline data stored in mass storage 48 provides average values (features) and the standard deviation from these average values for points or regions of interest in each of the signals. The sampled signals for a valve can be scanned to locate the occurrence of peaks, such as point I1, and valleys, such as point I2, in the motor current signal even if these extreme points do not occur at the same time as those in the baseline averages. Deviations in value as well as the time of occurrence can be detected and, by comparison with the baseline data, can be used to determine the extent of deviation therefrom in response to the sensing of the operational characteristics, e.g., motor current.

For example, the standard deviations for the extreme points I1 and I2 in the baseline data can be compared with the deviations of the sampled data from the baseline data. If the deviation in the sampled data at any of the points is greater than the standard deviation, the signal may be recognized as an aberration to be passed on to the expert system for diagnosis at step 78. The standard deviation or some other appropriate measure of the proportion of the deviation of the sampled data from the baseline data is used so that characteristic features, output as processed signals from the data extraction step 74, are dimensionless. For example, the characteristic features corresponding to each point or region of interest in the sensor signals may be indicated as normal, high, very high, low or very low, depending on the relation of the sampled data for that characteristic feature to the standard deviation of the averages collected as the baseline data. This provides a significance indication for each of the characteristic features in dependence upon the magnitude of the deviations between the sensor signals and the baseline data corresponding thereto.

The I/O processor 44 also includes time sensing means for providing timing of the sensor signals so that the deviation in time from the average time of occurrence of extreme points can be detected. In addition, such means permits valve stem speed to be output as a characteristic feature in dependence upon change in the position of the valve stem versus time.

The characteristic features which are output as processed signals from the diagnostic processor 46 or data extraction step 74 preferably include motor current during movement, indicated by the straight line I4 between points I3 and I5 in FIG. 6 and stem strain during this period of time indicated by the straight horizontal line labeled S7. The valve stem speed is illustrated in FIG. 6 as the slope of the diagonal line labeled P5.

The next step in the flow diagram illustrated in FIG. 3 is to decide in decision step 76 whether to log the sensor signals based on the characteristic features output from the data extraction step 74 and decision step 76. In most cases, if the characteristic features indicate deviation from the baseline data, the extracted data will be stored. In addition, data which does not deviate a significant amount may be periodically stored in the mass storage unit 48 to provide historical data on the valve. The data which is stored may be the numerical values of all or important portions of the sensor signals, rather than the dimensionless characteristic features so that trend analysis can be performed at a later date upon the more precise numeric data.

The next decision is to determine at step 78 whether the characteristic features should be passed to the expert system (module 79 in FIG. 4). Generally speaking, if there is any deviation from the baseline data, the file name of the sample data is passed in step 80 to the expert system where valve diagnostics are performed in step 82 using the rule base. As indicated in FIG. 1, the rule base expert system 50 may be a separate physical processor, but typically will be combined with the diagnostic processor 46. There are many types of expert system development packages available on the market today. For example, PERSONAL CONSULTANT PLUS (PC Plus) is an expert system development shell from Texas Instruments (TI) which will run on TI and IBM hardware.

There are many advantages to using an expert system shell, such as PC Plus, to diagnose the likely cause of the deviations from the baseline data. One of the advantages is that rules can be independent of one another which permits changes to be made easily. In addition, the inference mechanism of PC Plus and similar shell programs greatly facilitates the gathering of evidence for and against competing diagnoses. Some of the specific advantages provided by PC Plus are the ability to invoke various reasoning mechanisms based on confidence factors, the option to explain the reasoning process in English statements, the availability of active images representing the current state of the process, the ability to invoke meta-rules that can reason about the diagnostic rules and easy access to a large number of utility functions which aid in the development and maintenance of an expert system rule base and assist the user during a consultation with the system.

The rules are defined based upon laboratory tests of each type of valve. First, the baseline data, similar to that stored in mass storage 48 for each of the valves being monitored, is recorded for normal operation of the test valve. Next, typical malfunctions are simulated, based upon the numerous studies that indicate how valves in, e.g., power plants, fail. For example, a small, e.g., 0.005-inch impediment can be placed on the seat of the valve, the stem packing can be tightened and loosened from the specified value, and the position and torque limiter switch settings can be misadjusted. The deviations in the three (or more) signal traces are noted and rules can then be written based upon the deviations which are observed. In addition, a person of ordinary skill in the art of valve maintenance or design can add additional rules based upon personal knowledge (heuristic knowledge) regarding the type of malfunctions that can occur and the significance of their related sensor signals. At the end of this process, the rule base provides diagnosis means for comparing the processed signals indicating characteristic features with rules defining correspondence between known deviations and causes thereof to produce the diagnosis of the valve.

One example of a set of rules for a globe valve can be provided for the situation of "galling" or scraping of the globe into the body of the valve. Galling of the globe into the body will result in an increase in the motor drive current I4 (FIG. 6) and an increase in the compressive stem strain S7 (FIG. 6) during closing which is referred to as "closing ring" in the rules (see Appendix). During opening, the motor drive current will again be high and the tensile strain in the stem will also be high. These same symptoms, however, can also be caused by swelling of the packing. Swelling of the packing, on the other hand, will also be accompanied by high values for the engage current I3 and the closing pre-strain S3, when the valve is closing, or high values for the engage current and the opening pre-strain when the valve is opening. The set of rules governing the signals add and subtract confidence in a diagnosis for galling of the globe into the body and packing swelling in the manner indicated in the Appendix which contains a few rules, essentially as output from PC Plus in English, in which the confidence factors are indicated as percentages.

Other relationships between causes and deviations can be provided by one of ordinary skill in the art by following the laboratory procedure and application of personal and published knowledge. For example, the studies by Haynes and Eissenberg at ORNL which are available through the Department of Energy, provide detailed information about the relationship between aberrations in motor current and malfunctions in valves.

In addition to applying the expert system rule base to the characteristic features for a single sample, the expert system may also be used to provide trend analysis means for detecting a trend in changes in the sensor signals by analyzing the historical data stored in the mass storage unit 48. For every characteristic feature that is not normal, the deviation versus time curve can be produced analytically according to well known regression methods. Based on these curves, the state of the sensors at any future time can be predicted assuming that current trends remain in effect.

In a system according to the present invention, trend analysis can be used by the expert system to diagnose the predicted state of sensor data for any chosen date. The dates of greatest interest are the next service date for the valve, the next scheduled outage date for the installation and the date at which the first valve malfunction reaches unacceptable levels. Operation can continue if none of the deviations reaches unacceptable levels before the next service date. Otherwise, if the next outage date occurs before the scheduled service date, the outage date analysis is performed and operation may continue until that date if the deviations remain acceptable. Lastly, if the valve is predicted to fail before the dates mentioned, the expert system will show the predicted failure date and the diagnosis of the failure on that date. Maintenance personnel can use this information to make decisions regarding maintenance during unscheduled outages.

In other words, the analysis in block 84 can be used to extrapolate from the trend data the expected useful life of the valve. Based upon this analysis, scheduling recommendations can be produced indicating which valves should be repaired first during the next outage whether the outage is planned or unplanned. For example, if an outage occurs due to a malfunction of another unit, such as a turbine, in the plant, the valves whose operation has been most seriously degraded can be repaired while the turbine is being repaired. Similarly, during scheduled maintenance, a list of valves to be repaired can be produced, including the likely causes of the malfunctions in each valve. Thus, if new parts are needed, the parts can be ordered (only for malfunctioning valves) and will be on-hand to be used in the repair of the valves during the scheduled outage. Also, valves whose signal traces show them to be "healthy" may be removed from the maintenance plan, and maintenance crews, time and costs reduced accordingly.

In order to make use of the diagnosis and analysis performed by the diagnostic processor 46 and rule based expert system 50, the information must be conveyed to those in charge of valve maintenance. First, it is desirable to provide an immediate indication when the diagnosis means diagnoses a valve malfunction. This can be provided by a display of STATUS as indicated at the bottom of the main menu in FIG. 5. An operator at the operator station 52 (FIG. 1) can then select option 1 (Summary of Performance) in which a display such as that in FIG. 7 would be provided by processing in module 85 of FIG. 4. The malfunctioning valves can be highlighted by high intensity, reverse video, or alternate colors, as known in the art of data display. If option 3 is chosen, an analysis menu like that illustrated in FIG. 8 may be displayed by module 84 in FIG. 4.

Selection of option 6 from the analysis menu will provide a prediction of the time to failure of the malfunctioning valves or of any valves which are selected. The time to failure is preferably predicted using linear regression analysis of characteristic features (the ratio of specific data points to the baseline) in the historical data which trends toward an unacceptable value. The predicted time of failure for a component is based on the results of the regression analysis and the time between actuations stored in the trend database 86. In addition, the main program illustrated in FIG. 3 may include a step 88 for generating reports and action recommendations periodically. Thus, at least one of the trend data and the scheduling recommendations may be produced upon at least one of a request by the operator and a scheduled basis. These reports may be stored in mass storage unit 48 for display at the operator station 52 or produced on a hard copy output device (not shown).

The reports which are produced can be of many different types and either predetermined or custom designed upon a request. If PC Plus is used as the expert system software, reports can be generated using the facilities provided by this software. It is also useful to use a commercial database product such as dBASE, RBASE, or preferably, INGRES, available from Relational Technology of Alameda, Calif., to store the configuration and historical databases. This particular database software has capabilities which are useful for manipulating the type of data, i.e., samples of sensors, which are received by the I/O processor 44 in a much better manner than the better known commercial database products.

One of the facilities that all three of these and most commercial database products provide is a means for changing the records in the database. Option 2 of the main menu illustrated in FIG. 5 provides a screen which controls access to maintenance records which may be displayed in the form illustrated in FIG. 9 by module 96 in FIG. 4. Additional information on a valve, such as sampling priority, logging frequency, etc., might also be included on this screen or one or more other screens associated with this valve using the component index or component tag.

The system is preferably designed as described above to provide modularity by separating the operation of the pre-processing performed in the diagnostic processor 46 from the rules in the expert system 50. Included in each of these modules are updating means for updating the baseline data after maintenance of one of the valves without affecting the expert system rule base and for updating the expert system rule base without requiring changes in the processing of the sensor signals.

For example, the baseline data may be updated when the last date serviced field in the maintenance record display (FIG. 9) is changed so that the next few actuations, e.g., 21, of the valve are recorded as new baseline data. Preferably, the diagnostic processor compares the new baseline data for the valve with the old baseline data and records the differences. This provides the plant maintenance personnel with an indication of the quality of the maintenance performed on the valve as well as a record of the changes which are made in a valve over time.

The rule base may be modified initially with information provided by plant maintenance personnel when a valve monitoring system is added to an existing plant. In addition, the historical data, including frequency of maintenance and changes made when a valve is maintained, can be used to modify the rule base to reflect the history of a particular valve. In addition, changes might be made to the rules used by the analysis routines to predict the expected life of the valve.

In addition to the three sensors described in the preferred embodiment, other sensors may be desirable for particular valves or particular applications. For example, a piezoelectric acoustic emission transducer 36 may be added to detect flow related problems inside the valve. Acoustic emission transducers are also capable of providing information regarding dry or tight packing, gear damage and mechanical wear, as known in the art. A resistive humidity/moisture detector 30, such as Panametrics hygrometer probe conditioned by a Panametrics Model 2100 hygrometer, may be used to detect leakage around the valve stem seal. In some valves, it may be desirable to include one or more high temperature piezoelectric accelerometers 32, such as an Endevco Model 2225. However, most information provided by accelerometers duplicates that which is provided by the motor current sensor 24.

In the preferred embodiment, the diagnostic system is applied to valves. However, with relatively minor modifications, the system can be used to monitor other operational units in a plant. For example, the motor current sensor system developed by Haynes and Eissenberg at ORNL was applied to other types of motors, such as a vacuum pump motor. Based upon the data derived from this study or by performing laboratory tests such as those described above for valves, an online plant operation monitoring system according to the present invention would include sensor means for continuously sensing conditions of operational units including, e.g., motor operated valves, pumps, snubbers, control rod drives, etc. In such a system, the sensor signals would be processed to extract characteristic features of each of the operational units based upon classification (in "frames" of rules), not merely by type of valve, but first by type of equipment. The rule base frames could easily be expanded to handle additional types of equipment without significantly affecting the rule frame for valves. Thus, the modularity of the monitoring system's design permits not only modifying the rules and signal processing separately and easily adding additional valves, but also expanding the monitoring system to cover different types of operational units in a plant.

The many features and advantages of the present invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

---

APPENDIX

Rule 075
IF 1) the valve motion is closing, and
   2) the closing drag is high,
THEN 1) there is weakly suggestive evidence (40%)
   that one of the possible causes is galling of the
   globe into the body, and
   2) there is suggestive evidence (60%) that one
   of the possible causes is packing swelling.

Rule 066
IF 1) the valve motion is closing, and
   2) the motor drive current at start of motion is high,
THEN 1) there is suggestive evidence (60%) that one
   of the possible causes is packing swelling.

Rule 068
IF the motor drive current is high,
THEN 1) there is suggestive evidence (50%) that one
   of the possible causes is galling of the
   globe into the body, and
   2) there is suggestive evidence (50%) that one
   of the possible causes is packing swelling.

Rule 095
IF the motor drive current at the start of motion
   is not high,
THEN there is suggestive evidence (60%) that one of
   the possible causes is not packing swelling.

Rule 097
IF 1) the valve motion is closing, and
   2) the compression peak in the stem before
   motion starts is not high,
THEN there is suggestive evidence (60%) that one of
   the possible causes is not packing swelling.

Rule 096
IF 1) the valve motion is closing, and
   2) the compression peak in the stem before
   motion starts is high,
THEN there is suggestive evidence (60%) that one of
   the possible causes is packing swelling.

---

What is claimed is:

1. An online valve diagnostic system for diagnosing improper operation of a valve, comprising:
    sensors, each sensor simultaneously sensing a different operational characteristic of the valve, to produce corresponding sensor signals;
    data acquisition means for transmitting the sensor signals;
    processing means for processing the sensor signals to produce processed signals, said processing means including
        sensor signal processing means for comparing each of the sensor signals with corresponding baseline data to determine deviation therefrom in response to sensing of the operational characteristic and outputting the deviation as one of the processed signals; and
        diagnosis means for comparing the processed signals with rules defining correspondence between known deviations and combinations of deviations and causes thereof to produce a diagnosis of the valve; and
    output means for outputting the diagnosis of the valve.

2. An online valve diagnostic system as recited in claim 1, wherein said processing means further comprises analysis means for analyzing the diagnosis of the valve to provide a maintenance scheduling recommendation.

3. An online valve diagnostic system as recited in claim 2,
    wherein said analysis means comprises trend analysis means for detecting a trend in changes in the sensor signals, and
    wherein said output means provides an immediate indication when said diagnosis means diagnoses a valve malfunction and also outputs at least one of the trend and the scheduling recommendation upon at least one of a request and a scheduled basis.

4. An online valve diagnostic system as recited in claim 1, wherein said diagnosis means compares the processed signals to establish a confidence factor for the diagnosis of the valve.

5. An online valve diagnostic system as recited in claim 4, wherein the valve includes a valve stem for providing physical movement in the valve, and
    wherein said sensors comprise:
        power sensing means for providing an indication of power used by the valve; and
        stem strain sensing means for directly sensing tension and compression of the valve stem.

6. An online valve diagnostic system as recited in claim 5, wherein said sensors further comprise position sensing means for directly sensing a position of the valve stem.

7. An online valve diagnostic system as recited in claim 5, wherein the valve is a motor operated valve, and
    wherein said power sensing means comprises a current sensor operatively connected to said data acquisition means, for sensing motor current.

8. An online valve diagnostic system as recited in claim 7,
    wherein said processing means further comprises timing means for providing timing of the sensor signals,
    wherein said sensors further comprise position sensing means for sensing a position of the valve stem, and
    wherein the processed signals include representations of motor current during movement, valve stem speed as change in the position of the valve stem versus time and stem strain during movement of the valve stem.

9. An online valve diagnostic system as recited in claim 8, wherein said diagnosis means provides a diagnosis of galling into the body of the valve if the motor current is increasing and the closing drag is increasing.

10. An online plant operation monitoring system for monitoring operational units in a plant, comprising:
    sensor means for continuously sensing conditions of the operational units in the plant to produce sensor signals;
    data storage means for storing baseline data and historical data for each of the operational units;
    data acquisition means for transmitting the sensor signals;

extraction means for extracting characteristic features of each of the operational units from the sensor signals corresponding thereto by comparing the sensor signals with the baseline data to determine deviations therefrom in proportion to the baseline data, whereby the characteristic features are dimensionless; and diagnosis means for evaluating the characteristic features by application of an expert system rule base.

11. An online plant operation monitoring system as recited in claim 10, wherein said extraction means further provides a deviation significance indication for each of the characteristic features, dependent upon the magnitude of the deviations between the sensor signals and the baseline data corresponding thereto.

12. An online plant operation monitoring system as recited in claim 11, wherein said diagnosis means further applies the expert system rule base to the characteristic features extracted for a corresponding operational unit to determine a confidence factor for the diagnosis of the corresponding operational unit.

13. An online plant operation monitoring system as recited in claim 12, wherein the operational units are valves.

14. An online plant operation monitoring system as recited in claim 10, further comprising means for updating the baseline data stored in said data storage means in response to maintenance performed on one of the operational units.

15. An online plant operation monitoring system as recited in claim 13, wherein said diagnosis means comprises means for modifying the expert system rule base without requiring modification of how the deviations are determined by said extraction means.

16. An online plant operation monitoring system as recited in claim 10, wherein said diagnosis means further applies the expert system rule base to all of the characteristic features extracted for a corresponding operational unit to determine a confidence factor for the diagnosis of the corresponding operational unit.

17. An online plant operation monitoring system as recited in claim 10, wherein the operational units are valves.

18. An online valve monitoring system for monitoring valves in a piping system, the valves having a valve stem actuated by a motor, said valve monitoring system comprising:

sensors for outputting sensor signals, each of the valves having at least three sensors corresponding thereto, the at least three sensors comprising:

a motor current sensor for detecting current drawn by the motor operating a corresponding valve;

a strain sensor, directly coupled to the valve stem, for sensing strain of the valve stem of the corresponding valve; and a position sensor, coupled to the valve stem, for sensing a position of the valve stem of the corresponding valve;

data acquisition means for transmitting the sensor signals from the valves to a remote location;

timing means for storing baseline data and historical data for each of the valves;

signal processing means for extracting characteristic features of the sensor signals from each of the valves by comparing the sensor signals with the baseline data to determine deviations therefrom in proportion to the baseline data, whereby the characteristic features are dimensionless, and for providing a deviation significance indication for each of the characteristic features in dependence upon the magnitude of the deviations between the sensor signals and the baseline data corresponding thereto;

diagnosis means for evaluating the characteristic features by application of an expert system rule base to provide a diagnosis of a malfunction capable of causing the deviations between the baseline data and the sensor signals corresponding thereto, for each valve and comparing the deviations corresponding to each valve to determine a confidence factor for the diagnosis thereof;

analysis means for analyzing the historical data to detect a trend in changes in the sensor signals and for providing maintenance scheduling recommendations;

output means for providing an immediate indication when said diagnosis means diagnoses the malfunction of one of the valves and for outputting at least one of the trend and the scheduling recommendations upon at least one of a request and a scheduled basis; and updating means for updating the baseline data after maintenance of one of the valves without affecting the expert system rule base and for updating the expert system rule base without requiring changes in the processing of the sensor signals.

19. An online valve monitoring system as recited in claim 18, wherein said data acquisition means comprises means for transmitting the sensor signals simultaneously, using frequency multiplexing.

* * * * *